(12) United States Patent
Moreno Molina et al.

(10) Patent No.: US 11,367,094 B2
(45) Date of Patent: Jun. 21, 2022

(54) METHOD FOR VALIDATING A VOUCHER

(71) Applicant: Banco Bilbao Vizcaya Argentaria, S.A., Bilbao (ES)

(72) Inventors: Javier Moreno Molina, Madrid (ES); Juan Ferrer Garcia, Madrid (ES)

(73) Assignee: Banco Bilbao Vizcaya Argentaria, S.A., Bilbao (ES)

( * ) Notice: Subject to any disclaimer, the term of this patent is extended or adjusted under 35 U.S.C. 154(b) by 119 days.

(21) Appl. No.: 16/975,030

(22) PCT Filed: Feb. 21, 2019

(86) PCT No.: PCT/EP2019/054289
§ 371 (c)(1),
(2) Date: Aug. 21, 2020

(87) PCT Pub. No.: WO2019/162366
PCT Pub. Date: Aug. 29, 2019

(65) Prior Publication Data
US 2021/0090108 A1 Mar. 25, 2021

(30) Foreign Application Priority Data
Feb. 22, 2018 (EP) .................................. 18382107

(51) Int. Cl.
*G06Q 30/00* (2012.01)
*G06Q 30/02* (2012.01)
(Continued)

(52) U.S. Cl.
CPC ....... *G06Q 30/0207* (2013.01); *G06Q 20/321* (2020.05); *H04L 9/0825* (2013.01);
(Continued)

(58) Field of Classification Search
None
See application file for complete search history.

(56) References Cited

U.S. PATENT DOCUMENTS 9,704,143 B2 * 7/2017 Walker ................. G06Q 20/065
9,727,909 B2 * 8/2017 Mackay ................ G06Q 40/04
(Continued)

FOREIGN PATENT DOCUMENTS

AU 2017100968 9/2017
EP 3236403 10/2017
(Continued)

OTHER PUBLICATIONS

Tim Swanson. "Great Chain of Numbers: A Guide to Smart Contracts, Smart Property and Trustless Asset Management." (2014). Retrieved online Feb. 6, 2022. https://s3-us-west-.amazonaws.com/chainbook/Great+Chain+of+Numbers+A+Guide+to+Smart+Contracts%2C+Smart+Property+and+Trustless+Asset+Management+-+Ti (Year: 2014).*

(Continued)

*Primary Examiner* — James A Reagan
(74) *Attorney, Agent, or Firm* — ALG Intellectual Property, LLC

(57) ABSTRACT

The present invention is related to a computer implemented method for validating a voucher in an electronic voucher system, the electronic voucher system comprising a voucher holder application, an attestation application, a voucher issuer application an issuer server application, a voucher collector application, a smart contract system or SCS. An electronic voucher system, a computer program product and a computer-readable storage medium for carrying out the steps of the method is also described.

8 Claims, 6 Drawing Sheets

(51) Int. Cl.
*G06Q 20/32* (2012.01)
*H04L 9/08* (2006.01)
*H04L 9/32* (2006.01)

(52) U.S. Cl.
CPC ....... *H04L 9/3247* (2013.01); *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 9,794,074 B2* | 10/2017 | Toll | G06F 21/6272 |
| 10,026,082 B2* | 7/2018 | Davis | G06Q 20/10 |
| 10,146,792 B1* | 12/2018 | Dobrek | G06Q 20/3829 |
| 10,438,290 B1* | 10/2019 | Winklevoss | G06Q 20/389 |
| 10,540,654 B1* | 1/2020 | James | G06Q 20/223 |
| 11,240,040 B2* | 2/2022 | Wentz | H04L 9/0897 |
| 2009/0150178 A1 | 6/2009 | Sutton et al. | |
| 2015/0006274 A1 | 1/2015 | Calbucci et al. | |
| 2015/0379510 A1 | 12/2015 | Smith | |
| 2016/0267472 A1 | 9/2016 | Lingham et al. | |
| 2016/0330034 A1* | 11/2016 | Back | G06Q 20/06 |
| 2016/0339298 A1 | 11/2016 | Kats | |
| 2017/0244707 A1 | 8/2017 | Johnsrud et al. | |
| 2017/0316390 A1 | 11/2017 | Smith et al. | |
| 2018/0197173 A1* | 7/2018 | Durvasula | G06Q 20/34 |
| 2019/0013943 A1* | 1/2019 | Maim | H04L 9/3218 |
| 2019/0068365 A1* | 2/2019 | Wright | H04L 9/0894 |
| 2019/0147431 A1* | 5/2019 | Galebach | G06F 21/64 705/44 |
| 2019/0236594 A1* | 8/2019 | Ehrlich-Quinn | G06Q 20/065 |
| 2020/0007331 A1* | 1/2020 | Wentz | G01S 19/14 |
| 2020/0112442 A1* | 4/2020 | Wentz | H04L 9/3297 |
| 2020/0133955 A1* | 4/2020 | Padmanabhan | H04L 9/3239 |
| 2020/0134656 A1* | 4/2020 | Padmanabhan | H04L 63/123 |
| 2020/0160320 A1* | 5/2020 | Williams | H04L 9/0897 |
| 2020/0162268 A1* | 5/2020 | Wentz | H04L 9/3247 |
| 2020/0219150 A1* | 7/2020 | Johnston | G06Q 30/0282 |
| 2020/0294011 A1* | 9/2020 | Robertson | H04L 9/0637 |
| 2020/0327250 A1* | 10/2020 | Wang | H04L 9/0897 |
| 2020/0327569 A1* | 10/2020 | Feng | H04L 9/3239 |
| 2020/0380825 A1* | 12/2020 | Purohit | G07F 17/3251 |
| 2020/0387893 A1* | 12/2020 | Maim | G06Q 20/3674 |
| 2021/0012282 A1* | 1/2021 | Smith | G06F 16/27 |
| 2021/0150632 A1* | 5/2021 | Schwartz | G06Q 40/12 |

FOREIGN PATENT DOCUMENTS

| | | | | |
|---|---|---|---|---|
| JP | 2019028525 A | * | 2/2019 | ......... G06F 16/2379 |
| JP | 2019083013 A | * | 5/2019 | ............. G06Q 20/02 |
| JP | 2019200556 A | * | 11/2019 | ......... G06Q 20/3825 |
| WO | 2017145019 | | 8/2017 | |
| WO | 2017174878 | | 10/2017 | |
| WO | WO-2017174878 A1 | * | 10/2017 | ........... A61B 5/1118 |

OTHER PUBLICATIONS

Fashion Law Institute. "Fashion Law Bootcamp: Special Edition." (Jul. 26-28, 2017). Retrieved online Feb. 6, 2022. http://fashionlawinstitute.com/wp-content/uploads/2017/07/Fashion_Law_Bootcamp_SE_2017W_Readings_Part1.pdf (Year: 2017).*
Sreda VC. "Money of the Future." (2017). Retrieved online Feb. 6, 2022. http://sreda.vc/wp-content/uploads/2017/11/MOTF_english.pdf (Year: 2017).*
Strepparava, D. "Deployment and analysis of a blockchain-based local energy market." (Nov. 2022). Retrieved online Feb. 6, 2022. https://www.sciencedirect.com/science/article/pii/S2352484721014293 (Year: 2022).*
United Nations. "The Future is Decentralised Block Chains, Distributed Ledgers, & The Future of Sustainable Development." Retrieved online Feb. 6, 2022. (Nov. 15, 2017). https://www.undp.org/content/dam/undp/library/innovation/The-Future-is-Decentralised.pdf (Year: 2017).*
Csiro. "Distributed Ledgers Scenarios for the Australian economy over the coming decades." (May 2017). Retrieved online Feb. 6, 2022. https://publications.csiro.au/rpr/download?pid=csiro:EP175257&dsid=DS1 (Year: 2017).*
International Preliminary Report on Patentability received in International Application No. PCT/EP19/054289, dated Jun. 4, 2020.
International Search Report and Written Opinion received in International Application No. PCT/EP19/054289, dated Apr. 1, 2019.

* cited by examiner

METHOD FOR VALIDATING A VOUCHER

TECHNICAL FIELD OF THE INVENTION

The present invention belongs to the technical field of electronic voucher systems and, in particular, to monitor and assure that the voucher is correctly redeemed. More particularly, the present invention relates to the technical field of decentralized electronic voucher systems.

BACKGROUND OF THE INVENTION

An electronic voucher trading system is typically implemented through a third party provider, namely the voucher trading system provider. This party guarantees that the voucher is not redeemed more times than it is permitted and only by its rightful owner.

Normally, the voucher trading systems comprise the following elements: an issuer, a holder and a collector. All these elements need to perform their actions through the voucher trading system provider, which acts as intermediary and trusted third party.

However, the use of said intermediary third party increases the price of the maintenance of the voucher system. Another drawback is that all the elements of the system shall share personal information reducing its privacy. For example, the voucher holder shall share its identity, credit card number, etc., with the intermediary third party.

Another problem of this system is that it is implemented in a centralized system due to use of the intermediary third party. The problems of centralized systems are well known in state of art, in particular, this kind of systems are very sensible to attacks such as deny of service attacks. Other problem of these systems is that they may sell the information of the registered users to other companies in order to increase their profits reducing even more the privacy of the users.

US 20160267472 A1 discloses a method and system to standardized digital wallets into a unified wallet system, however it does not specify any type of voucher.

In view of the state of the art, there is a need for avoiding the use of third parties in the electronic voucher system in order to increase the efficiency, the privacy and reducing the costs of this kind of systems.

SUMMARY OF THE INVENTION

The present invention provides an alternative solution for the aforementioned problems, by a computer-implemented method for validating a voucher in an electronic voucher system according to claim 1 and a computer program, a computer-readable storage medium and an electronic voucher system according to claims 6 to 8. In dependent claims, preferred embodiments of the invention are defined.

In a first inventive aspect, the invention provides a computer-implemented method for validating a voucher in an electronic voucher system, the electronic voucher system comprising:
- a voucher holder application,
- an attestation application configured to measure external data, preferably through at least one sensor subsystem,
- a voucher issuer application configured to set voucher issuance parameters,
- an issuer server application,
- a voucher collector application,
- an smart contract system configured to implement a distributed ledger between all its elements of the smart contract system, wherein the computer-implemented method comprises the following steps,
   a) creating at least one attestation threshold and a voucher by the voucher issuer application,
   b) sending the at least one attestation threshold and the voucher from the voucher issuer application to the issuer server application,
   c) receiving by the issuer server application, the identifier of the voucher holder application and the attestation application,
   d) creating a smart contract template by the issuer server from the at least one attestation threshold, the voucher, the identifier of the voucher holder application and the attestation application, and registering the public key of the issuer server application in the smart contract system and signing the smart contract template with the private key of the issuer server application
   e) sending by the issuer server application, the smart contract template to the smart contract system,
   f) registering the smart contract template in the smart contract system, creating a smart contract, wherein the smart contract comprises the at least one attestation threshold, the voucher, the identifier of the voucher holder application and the identifier of the attestation application, a redemption state and a resolution state, and checking the digital signature received from the issuer server application using the public key of the issuer server application,
   g) sending an smart contract identifier to the voucher holder application,
   h) receiving by the smart contract system at least one attestation from the attestation application,
   i) receiving by the smart contract system a voucher request from the voucher holder application,
   j) validating the voucher request by the smart contract system, wherein,
      if the set of the at least one received attestation fulfils the at least one attestation threshold of the smart contract, the smart contract system sets the resolution state as granted, and
      if the at least one received attestation not fulfils the at least one attestation threshold of the smart contract, the smart contract system (SCS) sets the resolution state as denied and
      wherein the voucher is signed by the voucher holder application using its private key if the resolution state is granted;
   k) registering the public key of the voucher holder application in the smart contract system,
   l) sending a redemption request by the voucher holder application to the voucher collector application, wherein the redemption request comprises the smart contract identifier received in step g) and is signed with the private key of the voucher holder application,
   m) checking by the voucher collector application in the smart contract system, the voucher holder application of the smart contract associated to the redemption request,
   n) checking by the voucher collector application in the smart contract system, the resolution state of the smart contract associated to the redemption request,
   o) checking by the voucher collector application in the smart contract system, the digital signature of the voucher holder application of step l) using the public key of the voucher holder application, p) checking by the voucher collector application the redemption state of the voucher in the smart contract, q) if the redemption state is unredeemed, the resolution state is granted and the digital signature of the voucher holder application and the voucher holder application are valid, sending by the voucher collector application a reward to the voucher holder application, and r) marking the redemption state of the voucher in the smart contract as redeemed and wherein the method further comprises a step s) of sending by the smart contract system (SCS) to the voucher holder application, a notification of a change of the resolution state, and checking the digital signature received from the voucher holder application in step j) using the public key of the voucher holder application.

The electronic voucher system comprises a plurality of applications, e.g., a voucher holder application, an attestation application, a voucher issuer application, an issuer server application and voucher collector application. It should be understood that an electronic device is configured to execute each application, thus the electronic voucher system respectively may comprise a voucher holder, an attestant, a voucher issuer client, an issuer server, voucher collector and a smart contract system.

When the smart contract is registered in the smart contract system, a smart contract identifier related to said smart contract is created. Then, the smart contract identifier is sent to the voucher holder application. The voucher holder application can use the smart contract identifier in order to identify the smart contract that it can request with the voucher request. In a particular embodiment, the voucher request comprises the smart contract identifier. Advantageously, the smart contract identifier allows the voucher holder application and user to have a plurality of smart contracts wherein a plurality of vouchers can be obtained.

The voucher holder application is configured to register the identity of the user and other personal data and cypher them in order to create an identifier of the voucher holder application. Advantageously, the privacy of the user is increased by the voucher holder application because the identifier is a pseudonym. Additionally, the voucher holder application is configured to enable the voucher holder to check the voucher state and claim the reward, providing proof of voucher ownership and reward granting. Additionally, the voucher holder application is configured to obtain and store at least one voucher in order to redeem to the voucher collector application.

The voucher collector is an entity configured to exchange a granted voucher for the promised service stated in the smart contract through the voucher collector application. The promised service may be an access for a web page or a discount voucher or any other type of goods.

The attestant is an electronic device comprising at least one sensor subsystem. The attestant is configured to measure external data, preferably, through the attestation application and the at least one sensor subsystems. The external data may be the given steps of a person, or the number of strokes given during swimming, or the position of the attestant, or the speed of a person during walking or running, or a combination of them. Thus, the attestation application is configured to enable an attestant to securely attest to the smart contract, its gathered data that certifies the fulfilment of the voucher holder reward conditions.

In other embodiment, after receiving the smart contract identifier, the voucher holder application sends said smart contract identifier to the attestant application. In this embodiment, the attestation comprises said smart contract identifier.

Thus, the method of the invention allows validating a voucher in decentralized reward voucher trading system which comprises a plurality of applications where a smart contract is deployed by the voucher issuer application on the smart contract system. In particular, the method validates the voucher if a voucher request is received, thus, the voucher holder should request the voucher in order to obtain it and this request set the validating process.

Additionally, the set of the at least one received attestation should fulfil at least one attestation threshold. This means that the at least one received attestation may be a single attestation, e.g., running 20 km, or may be a set of attestations, e.g., running 1 km in seven days in a row. In the latter case, the attestation application sends daily reports and thus there is a set of attestations stored in the smart contract, and the attestation threshold may be understood as receiving seven daily reports in a row which states that the holder has run 1 km per day.

Throughout this document, "voucher" will be understood as a digital right that indicates a credit against future purchases or expenditures.

As attestation threshold should be understood as the set of parameters or parameter which establish the condition to be fulfilled by the holder and registered by the attestant in order to claim the voucher.

The voucher issuance parameters are managed by the voucher issuer application which enables the configuration and deployment of the smart contract by the issuer server. Examples of voucher issuance parameters are: identification of a client, type of attestation application associated to each client, collector of the voucher, the voucher, etc. As a client may be understood, a voucher holder application where a holder is registered and it can be identified. The holder is owner of the voucher, who is eventually able to redeem its value.

Thus, the voucher issuance parameters are used to create the smart contract templates. The smart contract template is a smart contract which has not been registered in the smart contract system.

The smart contract comprises, as attributes, the applications or group of applications that may play the role of the voucher holder, the attestant and the collector. Additionally, the smart contract further comprises the resolution state of the voucher, in particular, whether the reward condition is satisfied or not and as a consequence if the voucher can be claimed. Further, the smart contract also comprises the redemption state of the voucher, that is, whether the reward is redeemable or has already been collected.

The smart contract can be written by the attestant or the attestation application which attest the activity of the holder in order to resolve if the conditions of the smart contract are fulfilled.

The smart contract system, or SCS, is a distributed ledger comprising a plurality of nodes connected between them in a network. In one embodiment, the distributed ledger is a database maintained and updated independently by each node. Preferably, a node is a computer connected to a network.

The database of the smart contract system is constructed and management by every node of the system. When node of the smart contract system registers a smart contract in his database every single node of the Smart Contract System checks if the register is valid and if a majority of nodes considers valid said new registration, each node of the smart contract system registers the new smart contract. In one embodiment, the smart contract system comprises the public key of each element of the electronic voucher system. In other embodiments, the smart contract system does not comprise any public keys of the elements of the electronic voucher system. In both cases, the smart contract system may receive the public keys of a new element of the electronic voucher system comprising or a former element of the electronic voucher system in order to check the digital signature of said element.

Advantageously, the method of invention avoids using a third party increasing the efficiency, the privacy and reducing the costs of the electronic voucher system.

The smart contract system is configured to send notification if the redemption state of a smart contract varies. In that case, the smart contract system will send to the voucher holder application a notification indicating the new resolution state. In particular embodiment, the notification comprises references to the smart contract of said voucher and as a consequence any other elements of the electronic voucher system can request the resolution state of the smart contract. Thus, the smart contract system comprises the voucher.

Due to the notification, the voucher holder application is aware if it can claim the voucher or not. Advantageously, this embodiment enhances the efficiency of the system because it avoids to the voucher holder application checking if the voucher can be claimed.

As stated, the method of the first inventive aspect comprises the following steps,
  registering the public key of the voucher holder application in the smart contract system,
  sending a redemption request by the voucher holder application, wherein the redemption request comprises the smart contract identifier received in step g) and is signed with the private key of the voucher holder application,
  checking by the voucher collector application in the smart contract system, the voucher holder application of the smart contract associated to the redemption request,
  checking by the voucher collector application in the smart contract system, the resolution state of the smart contract associated to the redemption request,
  checking by the voucher collector application in the smart contract system, the digital signature of the voucher holder application using the public key of the voucher holder application,
  checking by the voucher collector application the redemption state of the voucher in the smart contract,
  if the redemption state is unredeemed, the resolution state is granted and the digital signature of the voucher holder application and the voucher holder application are valid, sending by the voucher collector application a reward to the voucher holder application, and
  marking the redemption state of the voucher in the smart contract as redeemed.

As the redemption request is signed with the private key of the voucher holder application, the voucher collector application can check the authenticity of the redemption request with the public key of the voucher holder application. Advantageously, this embodiment increases the privacy of the user because the authentication of the voucher holder application is cryptographically performed and, as a consequence, none user identification is required.

Given that the smart contract identifier is comprised in the redemption request, the voucher collector application can check in the smart contract system which voucher and smart contract are trying to be redeemed. Additionally, the voucher collector application may also check the state of the smart contract and its attributes.

The method of the invention through the Smart Contract System enables the voucher holder to prove its holder condition to any counterparty, as well as the fulfilment of the reward condition. The collector can therefore individually check the state of the voucher and redeem it or not according to the verification result.

Additionally, the voucher collector application is configured to enable the collector participant, e.g. a merchant, to check that a voucher is indeed issued to the claiming holder and that the reward resolution is positive, in order to exchange the voucher for goods or services. It also allows the collector to mark the voucher as redeemed, so that it cannot be redeemed more times than allowed by an unaware collector.

Thus, smart contract can be written by voucher collectors or voucher collector applications, to mark the voucher as redeemed, in order to prevent more than one redemption.

In a particular embodiment, the step f) further comprises registering the public key of the attestation application in the smart contract system, in step h) the at least one attestation is signed with the private key of the attestation application, and wherein the step h) further comprises a step of checking the digital signature received from the attestation application using the public key of the attestation application.

As stated, step d) of the first inventive aspect comprises registering the public key of the issuer server application in the smart contract system and signing the smart contract template with the private key of the issuer server application, and the step f) comprises a step of checking the digital signature received from the issuer server application using the public key of the issuer server application.

Further, as also stated, in step j) the voucher is signed by the voucher holder application using its private key if the resolution state is granted. Also, step s) comprises a step of checking the digital signature received from the voucher holder application using the public key of the voucher holder application.

In other embodiment, the smart contract system, or SCS, is a blockchain system.

In a particular embodiment, at least one of the sending steps is performed by using transport layer security, TLS.

Advantageously, the first inventive aspect, along with the above embodiments, provide further layers of security which enhance the privacy of the users of the system and the authenticity of the data transmitted to the smart contract system.

In a particular embodiment, the at least one attestation application is executed in an activity tracking electronic device, preferably a running band.

In a second inventive aspect, the invention provides a computer program comprising instructions which, when the program is executed by a computer, cause the computer to carry out the steps of the method of any of the previous embodiments.

In a third inventive aspect, the invention provides a computer-readable storage medium comprising instructions which, when executed by a computer, cause the computer to carry out the steps of the method of any of the previous embodiments.

In a fourth inventive aspect, the invention provides an electronic voucher system comprising means for carrying out the steps of the method of any of the previous embodiments.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

As it will be appreciated by one skilled in the art, aspects of the present invention may be embodied as a system, method or computer program product.

Figure 1:
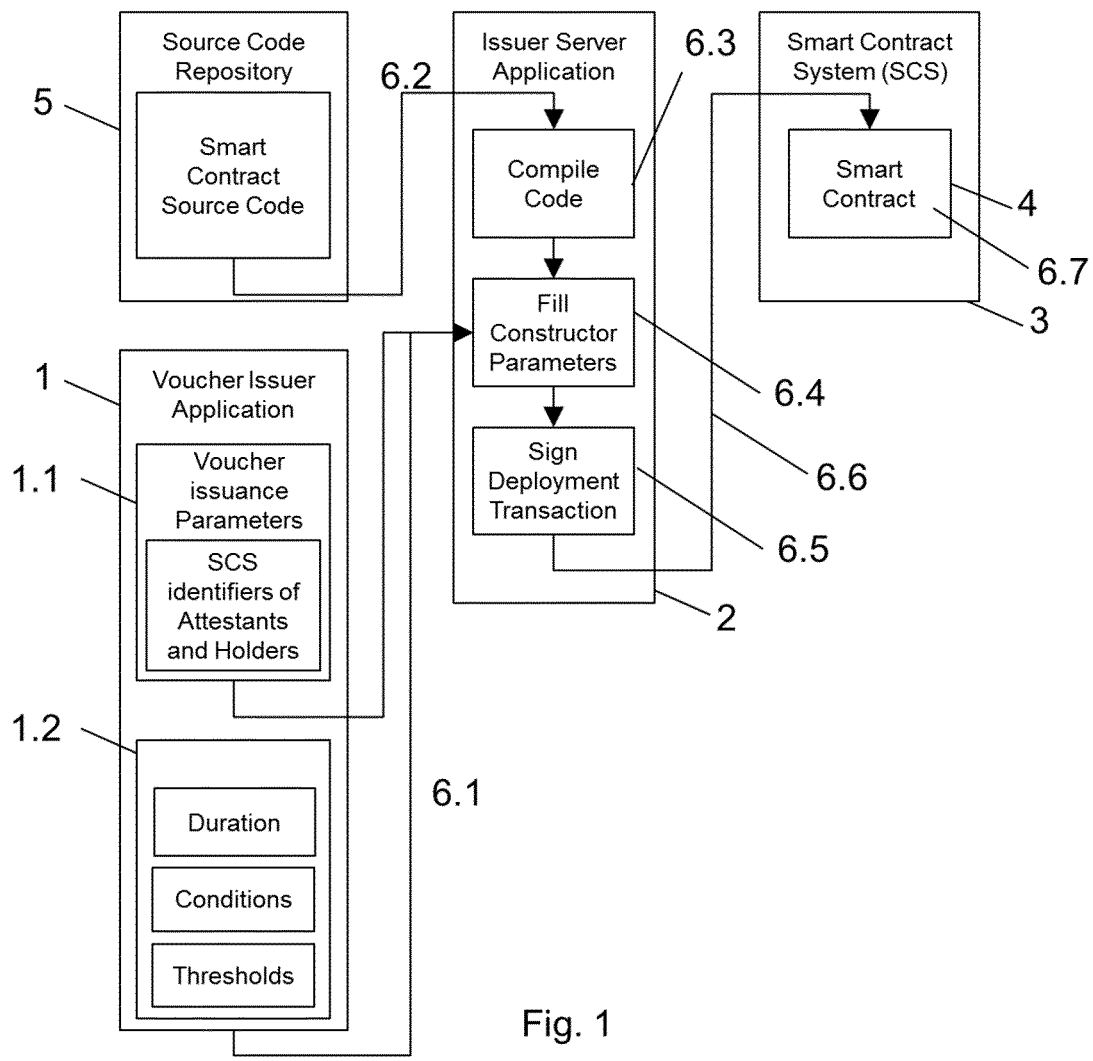
FIG. 1 This figure shows an embodiment of the method of the invention.

FIG. 1 shows an embodiment of the generation of the smart contract (4) according to the method of the invention. As it can be appreciated, in this embodiment the electronic voucher system comprises a source code repository (5), an issuer client application (1), an issuer server application (2) and a smart contract system (3) or SCS. Additionally, the electronic voucher system comprises at least one holder application.

The source code repository (5) is a database wherein predefined code lines or smart contract source code are stored. Said code lines are configured to create and compile a compiled contract template. As most of the elements are previously predefined in the source code repository, it (5) advantageously enhances the efficiency of the method.

The issuer client application (1) comprises voucher issuance parameters (1.2) with at least one identifier of the attestants and at least one holder. These identifiers will be registered in the smart contract and they will set which voucher holder or voucher holder application and which attestant or attestation application may interact and write in the smart contract (4). In this embodiment, the voucher holder application is an application of a smartphone, the voucher holder is the smartphone, the attestant is a running band and the attestation application is an application executed in the running band.

Additionally, the issuer client application (1) further comprises attestation thresholds (1.2) which describe the terms of a voucher to be redeemed. In this embodiment, the attestation thresholds (1.2) comprises the duration of voucher, the conditions to be fulfilled in order to redeem the voucher and the thresholds which set if said conditions are fulfilled. As it is shown in FIG. 1, the voucher issuance parameters (1.2) are the following:

Duration: two weeks.
Conditions: 10.000 steps for 7 days in a row.
Thresholds: receiving every day a report from the running band that at least 10.000 steps have been performed.

In this embodiment, the issuer server application (2) is configured to retrieve the following parameters:

source code from the source code repository (5), and
the attestation thresholds (1.2) and the identifiers (1.1) of attestants and voucher holders from the issuer client application (1).

In other embodiments, the issuer server application (2) is configured to generate the smart contract template based on the identifiers (1.1) of attestants and holders and attestation thresholds (1.2) from the issuer client application (1).

In this embodiment the smart contract system (3) is a blockchain system and it (3) comprises the public keys of all elements registered in the electronic voucher system: the issuer client application (1), the issuer server application (2), the attestant and the voucher holder application. In other embodiments, the smart contract system (3) does not have the public keys of the element registered.

The method of the invention is implemented in the FIG. 1 as follows:

Step a): the voucher issuer application (1) creates the attestation thresholds (1.2). Additionally, the voucher issuer application (1) also creates the voucher.

Step b): The voucher issuer application (1) sends (6.1) the attestation thresholds (1.2) and the voucher to the issuer server application (2).

Step c): The issuer server application (2) receives the attestation thresholds (1.2) and the voucher. Previously, in this embodiment, the issuer server application (2) retrieves (6.2) smart contract code from the source code repository and compiles (6.3) the smart contract code creating a compiled smart contract template. In this step, the compiled smart contract template is smart contract where the fields of the smart contract are not fulfilled.

Step d): The issuer server application (2) creates (6.4) a smart contract template from the compiled smart contract template, the attestation thresholds (1.2), the voucher, the identifier of the voucher holder application and the attestation application. In this embodiment, the issuer server application (2) fills the compiled smart contract template with the attestation thresholds (1.2), the voucher, the identifier of the voucher holder application and the attestation application.

Step e): The issuer server application (2) sends (6.6) the smart contract template to the smart contract system (3). In this embodiment, the issuer server application (2) previously signs (6.5) the smart contract template with the private key of the issuer server application (2).

Step f). The smart contract system (3) registers (6.7) the smart contract template in the blockchain system creating a smart contract. In this embodiment, the smart contract system (3) previously checks the signature of the smart contract template using the public key of the issuer server application (2). If the signature is not valid the smart contract template is not registered. In this embodiment, a smart contract identifier related to the registered smart contract is created.

Step g) (not shown in the figures). The smart contract system (3) sends the smart contract identifier to the voucher holder application.

Figure 2A:
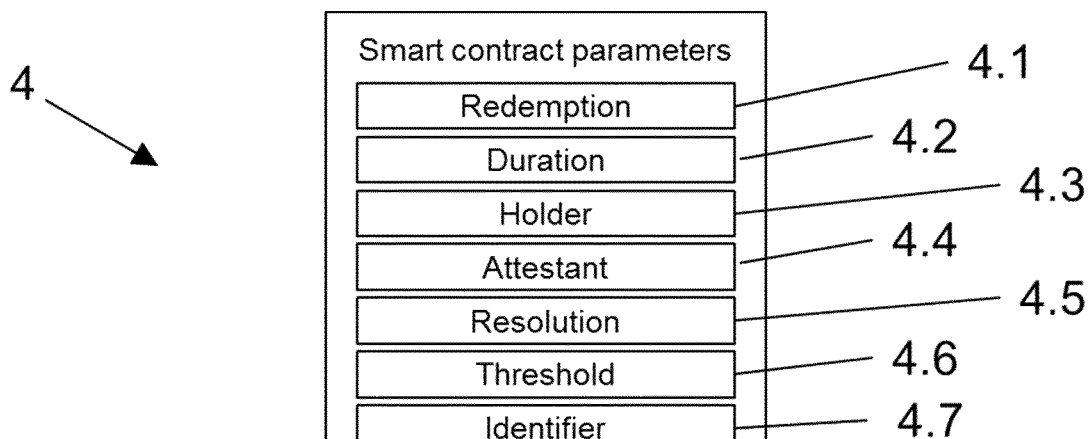
FIG. 2a This figure shows an embodiment of a smart contract stored in the smart contract system.

In FIG. 2a it can be appreciated the parameters of the smart contract (4) of the present embodiment. In particular, the smart contract (4) comprises the following parameters:

Redemption (4.1). It comprises the redemption state of the voucher, redeemed or not redeemed.

Duration (4.2). It comprises the deadline until the smart contract is valid. In this embodiment the duration (4.2) is two weeks.

Holder (4.3). It comprises the identifier of the voucher holder application or the voucher holder. In this embodiment the identifier is Javier's smartphone.

Attestant (4.4). It comprises the identifier of the attestation application or the attestant. In this embodiment, the attestant is a running band and the attestation application is "running band application version 1.0".

Resolution (4.5). It comprises the state of the voucher it can be granted, denied or void. When the parameter is created the resolution state is void.

Threshold (4.6). It comprises the requirements to be fulfilled to obtain the voucher. In this embodiment, receiving every day a report from the running band that at least 10.000 steps have been performed.

Identifier (4.7). It comprises data configured to identify the smart contract (4). In this example, the identifier (4.7) is "running contract #001".

Figure 2B:
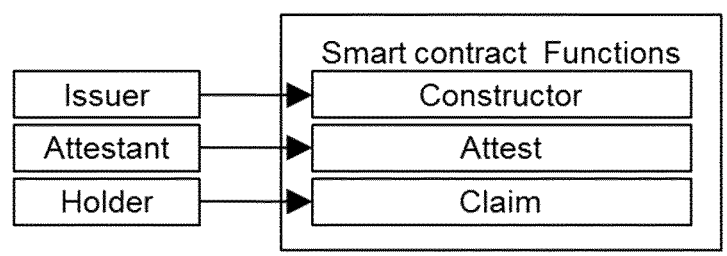
FIG. 2b This figure shows an embodiment of smart contract's functions stored in the smart contract system.

FIG. 2b represents the functions of the smart contract (4) and the elements of the electronic voucher system which interact with the smart contract (4). As it is shown in FIG. 1, the issuer server application (2) and the voucher issuer application (1) construct the smart contract template. Then, as it is indicated the attestant attests the performing of the voucher holder and the voucher holder may send or claim a redemption request when the conditions of the smart contract (4) are fulfilled.

Figure 3:
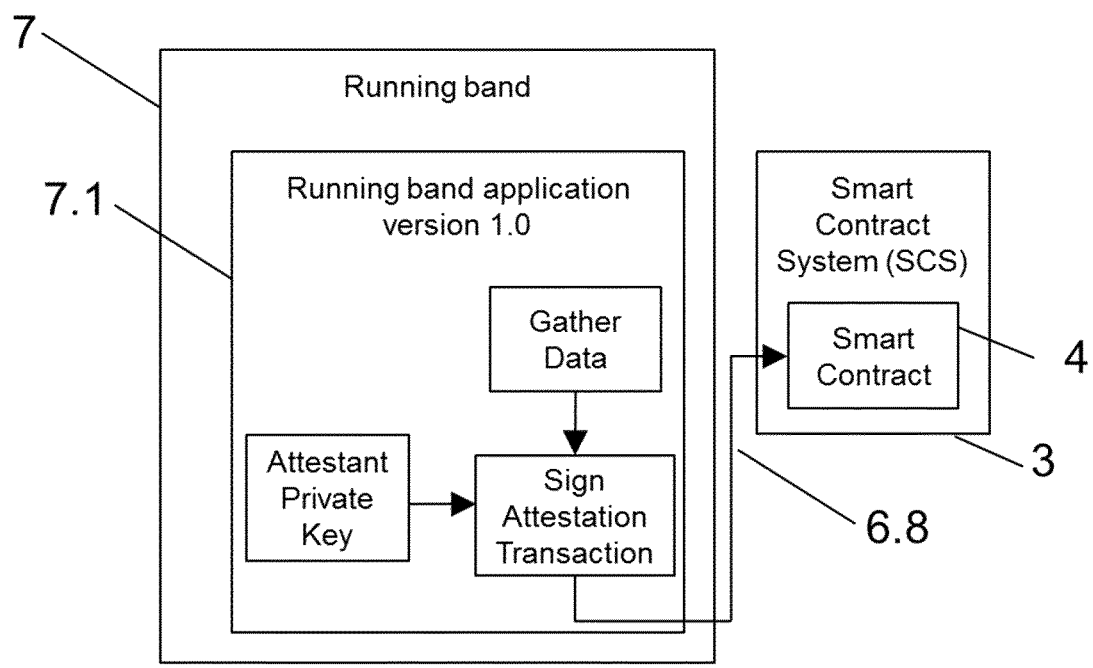
FIG. 3 This figure shows an embodiment of an attestation registration from the attestation application of the activity of a user in the smart contract stored in the smart contract system.

FIG. 3 shows the embodiment of step g) of the method of the invention. It can be appreciated that the attestation application (7.1), or running band application version 1.0, is configured to gather the physical data of the attestant (7), or running band. The running band (7) is configured to measure the number of steps per day of a person. Daily, the attestation application (7.1) is configured to obtain the numbers of steps walked by the person and send it to the smart contract system (3). In one embodiment the attestation, or daily report, is sent every at 11:00 pm. In other embodiments, the attestation application (7.1) is configured to set a determined date to send the attestation, or daily report, according to the needs of the user.

Then the attestation application (7.1) signs the attestation and the smart contract identifier (4.7) with the private key of the attestation application (7.1) and sends the attestation to the smart contract system (3). When the smart contract system (3) receives (6.8) the attestation, it (3) checks the digital signature using the public key of the attestation application and it is valid, the attestation is registered in the smart contract (4) indicated by the smart contract identifier (4.7).

Figure 4:
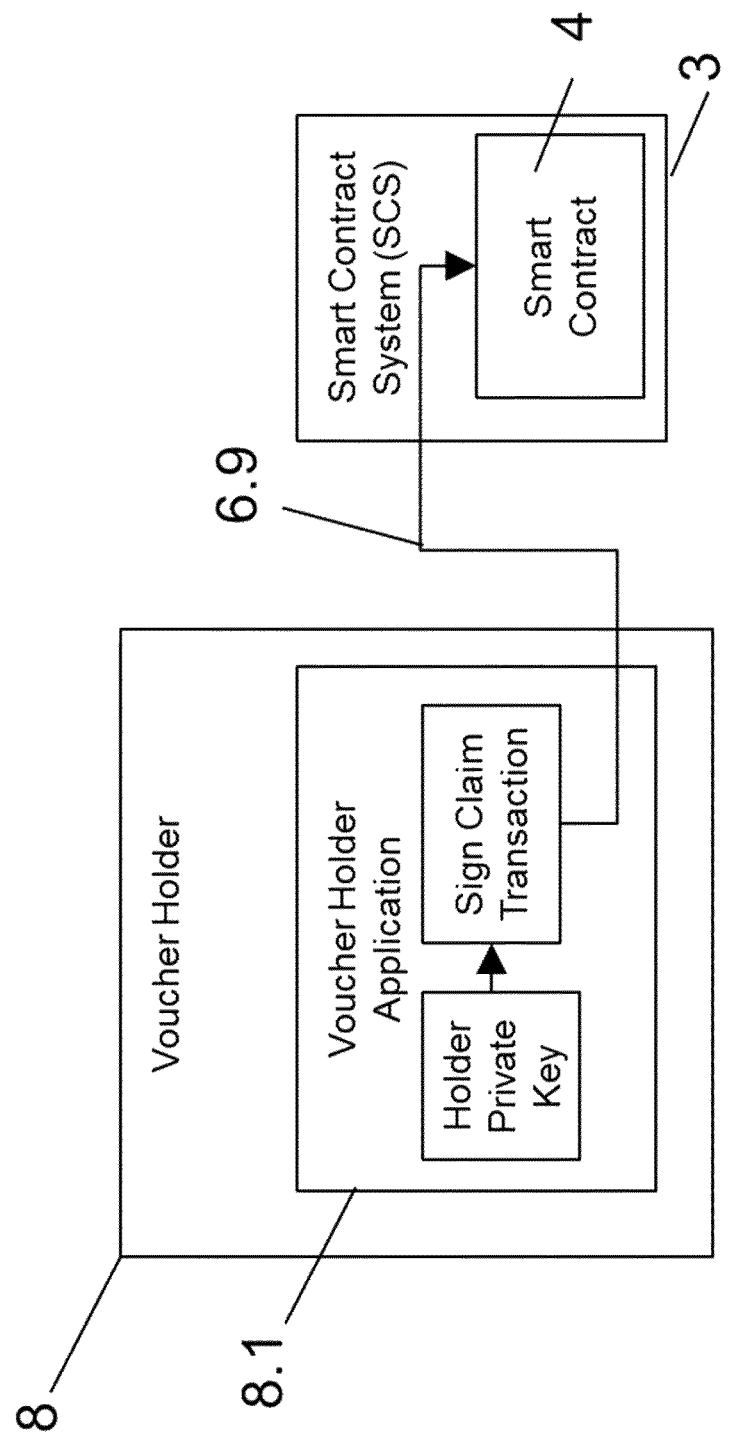
FIG. 4 This figure shows an embodiment of a voucher request of the voucher holder application.
Figure 5:
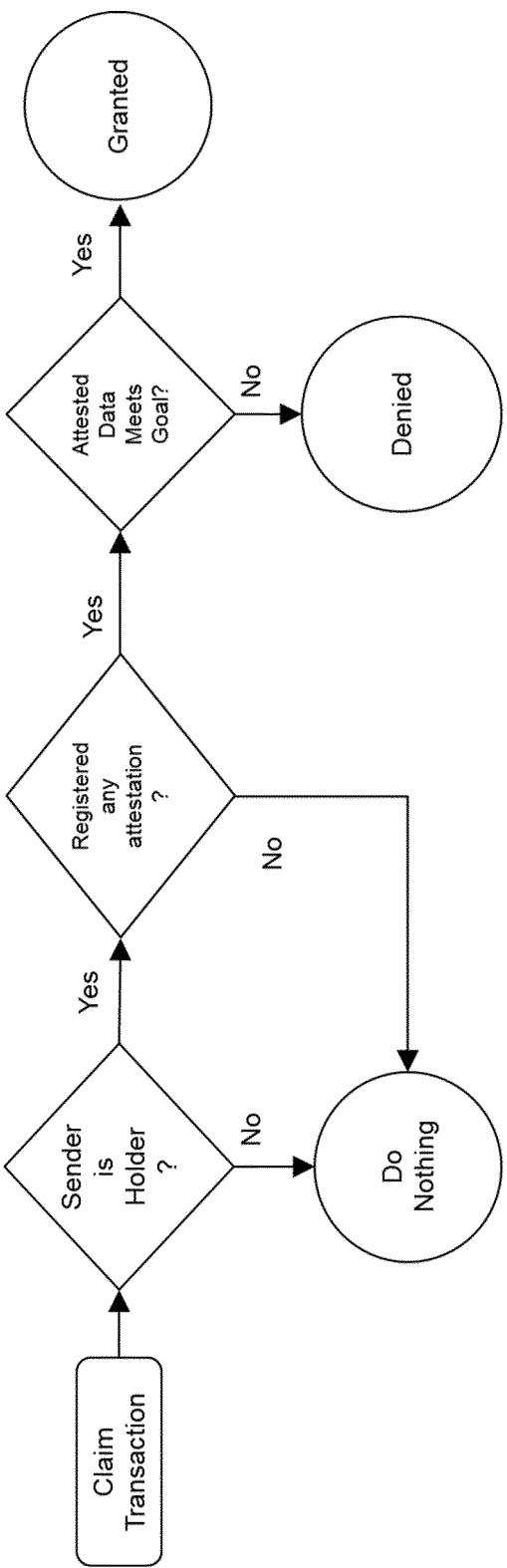
FIG. 5 This figure shows an embodiment of step of checking if a voucher should be granted according to the method of the invention.

FIGS. 4 and 5 show an embodiment of the steps i) to k) of the present invention. In FIG. 4, the voucher holder application (8.1) sends (6.9) from the voucher holder (8) to the smart contract system (3) a voucher request, wherein said voucher request comprises the smart contract identifier (4.7) and it is signed by the voucher holder application (8.1) with the private key of the voucher holder application (8.1).

When the smart contract system (3) receives the voucher request, it is validated as it is shown in FIG. 5:

Firstly, the smart contract system (3) checks if the signature corresponds to the holder of the voucher registered in the smart contract (4). If the signature is valid, it (3) validates if the conditions have been fulfilled of the smart contract indicated by the smart contract identifier (4.7). If the conditions are not fulfilled, the smart contract system (SCS) sets the resolution state of the voucher as denied.

Further, if the conditions of the smart contract (4) of the smart contract identifier (4.7) are fulfilled, the voucher request is granted and the the smart contract system (3) sets the resolution state as granted.

In this example, the voucher request is rejected if there is not any attestation registered (the SCS does nothing).

Then, the smart contract system (3) sends to the voucher holder application, a notification of a change of the resolution state and the method ends.

Figure 6:
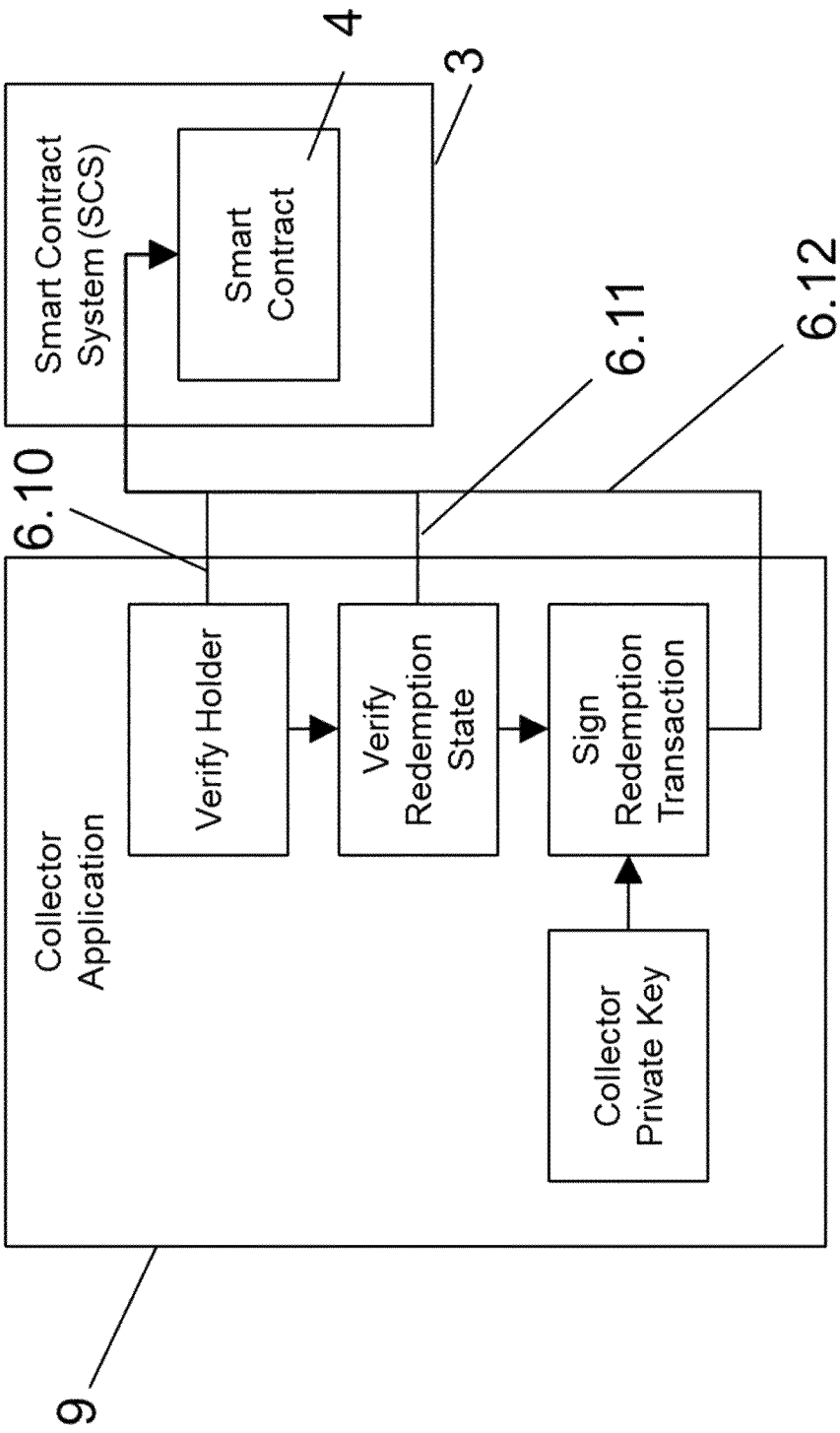
FIG. 6 This figure shows an embodiment of the checking by the collector application if a voucher should be redeemed.

FIG. 6 describes a further embodiment of the method described in FIGS. 1 to 5. In particular, the voucher holder application (8.1) sends a redemption request to the voucher collector application (9), wherein the redemption request comprises the smart contract identifier (4.7) received in step g) and it is signed with the private key of the voucher holder application (8.1).

Once the voucher collector application (9) receives the redemption request, it (9) checks the digital signature of the voucher holder application using the public key of the voucher holder application. In other embodiments, there is a previous step of registering the public key of the voucher holder application (8.1) in the smart contract system (3). Advantageously, said embodiments ensure an updated public key of the voucher holder application (8.1).

If the digital signature is not valid, the voucher collector application (9) ignores the redemption request. If the digital signature is valid, the voucher collector application (9) checks (6.10, 6.11) in the smart contract system (3) the following elements:

if (6.10) the voucher holder application (8.1) is the same voucher holder application of the smart contract (4) indicated by the smart contract identifier (4.7), if the resolution state of the smart contract (4) indicated by the smart contract identifier (4.7) and associated to the redemption request is granted, and if (6.11) if the redemption state of the smart contract (4) indicated by the smart contract identifier (4.7) and associated to the redemption request is unredeemed.

Then, if the redemption state (4.1) is unredeemed, the resolution state (4.5) is granted and the voucher holder application (4.3) is the same voucher holder application of the smart contract (4), the voucher collector application (9) sends a reward to the voucher holder application (8.1). In this embodiment the reward is a 5% of discount in a sport shop.

During the step of checking by the voucher collector application (9) in the smart contract (4), the smart contract system (3) checks the signature of the voucher collector (9), and it is valid, it (3) performs the checking operations requested by the voucher collector application (9). Otherwise, the smart contract system (3) ignores said request.

Once, the voucher collector (9) sends the reward to the voucher holder application (8.1), it (9) requests (6.12) with a signed request to the smart contract system (3), to change the redemption state as redeemed. Finally, the smart contract system (3) checks the signature of the voucher collector (9), and it is valid, it (3) marks the redemption state of the voucher in the smart contract (4) as redeemed.

In a preferred illustrative embodiment identified as "embodiment 1", a computer-implemented method for validating a voucher in an electronic voucher system is presented, the electronic voucher system comprising:
- a voucher holder application (8.1),
- an attestation application (7.1) configured to measure external data, preferably through at least one sensor subsystem,
- a voucher issuer application (1) configured to set voucher issuance parameters (1.2),
- an issuer server application (2),
- a voucher collector application (9),
- an smart contract system (3) configured to implement a distributed ledger between all its elements of the smart contract system (3), wherein the computer-implemented method comprises the following steps,
- s) creating at least one attestation threshold (1.2) and a voucher by the voucher issuer application (1),
- t) sending (6.1) the at least one attestation threshold and the voucher from the voucher issuer application (1) to the issuer server application (2),
- u) receiving (6.3) by the issuer server application (2), the identifier of the voucher holder application (8.1) and the attestation application (7.1),
- v) creating (6.4) a smart contract template by the issuer server (2) from the at least one attestation threshold (1.2), the voucher, the identifier of the voucher holder application (8.1) and the attestation application (7.1),
- w) sending (6.6) by the issuer server application (2), the smart contract template to the smart contract system (3),
- x) registering (6.7) the smart contract template in the smart contract system (3), creating a smart contract (4), wherein the smart contract (4) comprises the at least one attestation threshold (1.2), the voucher, the identifier (4.3) of the voucher holder application and the identifier (4.4) of the attestation application (7.1), a redemption state (4.1) and a resolution state (4.5),
- y) sending a smart contract identifier (4.7) to the voucher holder application (8.1),
- z) receiving (6.8) by the smart contract system (3) at least one attestation from the attestation application (7.1),
- aa) receiving by the smart contract system (3) a voucher request from the voucher holder application (8.1),
- bb) validating the voucher request by the smart contract system (3), wherein,
  - if the set of the at least one received attestation fulfils the at least one attestation threshold (1.2) of the smart contract, the smart contract system (SCS) sets the resolution state as granted, and
  - if the at least one received attestation not fulfils the at least one attestation threshold of the smart contract, the smart contract system (SCS) sets the resolution state as denied.

"Embodiment 2".—The method for validating a voucher according to "embodiment 1", wherein the method further comprises a step k) of sending by the smart contract system (SCS) to the voucher holder application, a notification of a change of the resolution state.

"Embodiment 3".—The method for validating a voucher according to "Embodiment 1", further comprising the following steps,
- registering the public key of the voucher holder application (8.1) in the smart contract system (3),
- sending a redemption request by the voucher holder application (8.1) to the voucher collector application (9), wherein the redemption request comprises the smart contract identifier (4.7) received in step g) and is signed with the private key of the voucher holder application (8.1),
- checking (6.10) by the voucher collector application (8.1) in the smart contract system (3), the voucher holder application (8.1) of the smart contract associated to the redemption request,
- checking by the voucher collector application (8.1) in the smart contract system (3), the resolution state of the smart contract associated to the redemption request,
- checking by the voucher collector application (8.1) in the smart contract system (3), the digital signature of the voucher holder application (8.1) using the public key of the voucher holder application (8.1),
- checking (6.11) by the voucher collector application (8.1) the redemption state of the voucher in the smart contract (4),
- if the redemption state is unredeemed, the resolution state is granted and the digital signature of the voucher holder application and the voucher holder application are valid, sending by the voucher collector application (8.1) a reward to the voucher holder application (8.1), and
- marking the redemption state (4.1) of the voucher in the smart contract (4) as redeemed.

"Embodiment 4".—The method for validating a voucher according to any of the previous "embodiments", wherein the step f) further comprises registering the public key of the attestation application (7.1) in the smart contract system (3),
in step h) the at least one attestation is signed with the private key of the attestation application (7.1), and
wherein the step h) further comprises a step of checking the digital signature received from the attestation application (7.1) using the public key of the attestation application (7.1).

"Embodiment 5".—The method for validating a voucher according to any of the previous "embodiments", wherein the step d) further comprises registering the public key of the issuer server application (2) in the smart contract system (3) and signing (6.5) the smart contract template with the private key of the issuer server application (2), and
the step f) further comprises a step of checking the digital signature received from the issuer server application (2) using the public key of the issuer server application (2).

"Embodiment 6".—The method for validating a voucher according to any of the previous "embodiments", wherein the step j) the voucher is signed by the voucher holder application (8.1) using its private key if the resolution state is granted.

"Embodiment 7".—The method for validating a voucher according to "embodiments 2 and 6", wherein the step k) further comprises a step of checking the digital signature received from the voucher holder application (8.1) using the public key of the voucher holder application (8.1).

"Embodiment 8".—The method for validating a voucher according to any of the previous "embodiments", wherein the smart contract system (3) is a blockchain system.

"Embodiment 9".—The method for validating a voucher according to any of the previous "embodiments", wherein at least one of the sending steps is performed by using transport layer security, TLS.

"Embodiment 10.—The method for validating a voucher according to any of the previous "embodiments", wherein the at least one attestation application (8.1) is executed in an activity tracking electronic device (8), preferably a running band.

"Embodiment 11".—A computer program comprising instructions which, when the program is executed by a computer, cause the computer to carry out the steps of the method of any of the previous "embodiments".

"Embodiment 12".—A computer-readable storage medium comprising instructions which, when executed by a computer, cause the computer to carry out the steps of the method of any of the "embodiments 1 to 10".

"Embodiment 13".—An electronic voucher system comprising means for carrying out the steps of the method of any of the "embodiments 1 to 10".

The invention claimed is:

1. A computer-implemented method for validating a voucher in an electronic voucher system, the electronic voucher system comprising:
   a voucher holder application,
   an attestation application configured to measure external data, preferably through at least one sensor subsystem,
   a voucher issuer application configured to set voucher issuance parameters,
   an issuer server application,
   a voucher collector application,
   a smart contract system configured to implement a distributed ledger between all elements of the smart contract system,
wherein the computer-implemented method comprises the steps of:
   a) creating at least one attestation threshold and a voucher by the voucher issuer application,
   b) sending the at least one attestation threshold and the voucher from the voucher issuer application to the issuer server application,
   c) receiving by the issuer server application, an identifier of the voucher holder application and the attestation application,
   d) creating a smart contract template by the issuer server from the at least one attestation threshold, the voucher, the identifier of the voucher holder application and the attestation application, and
   registering the public key of the issuer server application in the smart contract system and signing the smart contract template with the private key of the issuer server application,
   e) sending by the issuer server application, the smart contract template to the smart contract system,
   f) registering the smart contract template in the smart contract system, creating a smart contract, wherein the smart contract comprises the at least one attestation threshold, the voucher, the identifier of the voucher holder application and the attestation application, a redemption state and a resolution state, and
   checking the digital signature received from the issuer server application using the public key of the issuer server application,
   g) sending a smart contract identifier to the voucher holder application,
   h) receiving by the smart contract system at least one attestation from the attestation application,
   i) receiving by the smart contract system a voucher request from the voucher holder application,
   j) validating the voucher request by the smart contract system, wherein,
      if the set of the at least one received attestation fulfils the at least one attestation threshold of the smart contract, the smart contract system sets the resolution state as granted, and
      if the at least one received attestation does not fulfil the at least one attestation threshold of the smart contract, the smart contract system sets the resolution state as denied and
   wherein the voucher is signed by the voucher holder application using its private key if the resolution state is granted;
   k) registering the public key of the voucher holder application in the smart contract system,
   l) sending a redemption request by the voucher holder application to the voucher collector application, wherein the redemption request comprises the smart contract identifier received in step g) and is signed with the private key of the voucher holder application,
   m) checking by the voucher collector application in the smart contract system, the voucher holder application of the smart contract associated to the redemption request,
   n) checking by the voucher collector application in the smart contract system, the resolution state of the smart contract associated to the redemption request,
   o) checking by the voucher collector application in the smart contract system, the digital signature of the voucher holder application of step l) using the public key of the voucher holder application,
   p) checking by the voucher collector application the redemption state of the voucher in the smart contract,
   q) if the redemption state is unredeemed, the resolution state is granted and the digital signature of the voucher holder application and the voucher holder application are valid, sending by the voucher collector application a reward to the voucher holder application, and
   r) marking the redemption state of the voucher in the smart contract as redeemed and
wherein the method further comprises a step s) of
   sending by the smart contract system to the voucher holder application, a notification of a change of the resolution state, and
   checking the digital signature received from the voucher holder application in step j) using the public key of the voucher holder application.

2. The method for validating a voucher according to claim 1, wherein the step f) further comprises registering the public key of the attestation application in the smart contract system,
   in step h) the at least one attestation is signed with the private key of the attestation application, and
   wherein the step h) further comprises a step of checking the digital signature received from the attestation application using the public key of the attestation application.

3. The method for validating a voucher according to claim 1, wherein the smart contract system is a blockchain system.

4. The method for validating a voucher according to claim 1, wherein at least one of the sending steps is performed by using transport layer security, TLS.

5. The method for validating a voucher according to claim 1, wherein the at least one attestation application is executed in an activity tracking electronic device, preferably a running band.

6. A computer program comprising instructions which, when the program is executed by a computer, cause the computer to carry out the steps of the method of claim 1.

7. A computer-readable storage medium comprising instructions which, when executed by a computer, cause the computer to carry out the steps of the method of claim 1.

8. An electronic voucher system comprising means for carrying out the steps of the method of claim 1.

\* \* \* \* \*